United States Patent
Guenther

(10) Patent No.: US 12,196,197 B2
(45) Date of Patent: Jan. 14, 2025

(54) APPARATUS FOR COOLING-WATER EXTRACTION FOR A ROBOT INSTALLATION PLATE, HAVING AN ADJUSTABLE EXTRACTION VOLUME

(71) Applicant: Christian Guenther, Heilbronn (DE)

(72) Inventor: Christian Guenther, Heilbronn (DE)

( * ) Notice: Subject to any disclaimer, the term of this patent is extended or adjusted under 35 U.S.C. 154(b) by 728 days.

(21) Appl. No.: 17/429,590

(22) PCT Filed: Jan. 30, 2020

(86) PCT No.: PCT/DE2020/200010
§ 371 (c)(1),
(2) Date: Aug. 9, 2021

(87) PCT Pub. No.: WO2020/173528
PCT Pub. Date: Sep. 3, 2020

(65) Prior Publication Data
US 2022/0196009 A1     Jun. 23, 2022

(30) Foreign Application Priority Data

Feb. 28, 2019 (DE) .................. 10 2019 202 765.2
Mar. 27, 2019 (DE) .................. 10 2019 204 208.2

(51) Int. Cl.
*F04B 49/10*  (2006.01)
*B23K 11/30*  (2006.01)
(Continued)

(52) U.S. Cl.
CPC ........ *F04B 49/106* (2013.01); *B23K 11/3054* (2013.01); *B23K 11/36* (2013.01);
(Continued)

(58) Field of Classification Search
CPC ........ F04B 49/106; F04B 49/14; F04B 9/125; F04B 2205/09; B23K 11/3054; B23K 11/36; B23K 11/3018; B23K 37/003
(Continued)

(56) References Cited

U.S. PATENT DOCUMENTS 2,714,150 A * 7/1955 Kaiser ................ B23K 11/3018
                                                    219/89
4,352,470 A * 10/1982 Blakeslee ............. B21C 47/323
                                                    242/576.1
(Continued)

FOREIGN PATENT DOCUMENTS

DE         3306420 C1     5/1984
DE     101 01 787 A1      7/2002
(Continued)

OTHER PUBLICATIONS

International Search Report for Application No. PCT/DE2020/200010, dated Jun. 5, 2020, 2 pgs.
(Continued)

*Primary Examiner* — Minh Q Le
(74) *Attorney, Agent, or Firm* — Seed IP Law Group LLP

(57) ABSTRACT

An apparatus for cooling-water extraction for a robot installation plate is characterized by an adjustable extraction volume. The extraction volume is achieved by a sufficiently large extraction cylinder which has a maximum extraction volume, wherein the extraction volume is adjusted by a mechanical stroke limit of a piston located in the extraction cylinder. In at least one embodiment, the mechanical stroke limit is realized by an adjustment screw that is on or in the extraction cylinder. The adjustment screw forms a stop that provides an end position limit or stroke limit of the piston.

8 Claims, 8 Drawing Sheets

$V_{WVL}$ Volumetric flow rate of water on supply side
$V_{WRL}$ Volumetric flow rate of water on return side
$P_{DL}$ Compressed air
W Workpiece
S Welding gun
RIP Robot installation plate

(51) Int. Cl.
*B23K 11/36* (2006.01)
*F04B 9/125* (2006.01)
*F04B 49/14* (2006.01)
*B23K 37/00* (2006.01)

(52) U.S. Cl.
CPC .............. *F04B 9/125* (2013.01); *F04B 49/14* (2013.01); *B23K 11/3018* (2013.01); *B23K 37/003* (2013.01); *F04B 2205/09* (2013.01)

(58) Field of Classification Search
USPC ........................................................ 137/613
See application file for complete search history.

(56) References Cited

U.S. PATENT DOCUMENTS

| | | | | |
|---|---|---|---|---|
| 6,206,968 | B1* | 3/2001 | Minges | F04B 13/00 118/19 |
| 6,357,235 | B1* | 3/2002 | Cerro | F04B 9/105 60/645 |
| 2006/0024180 | A1* | 2/2006 | Lane | F04B 9/125 417/415 |
| 2006/0175379 | A1 | 8/2006 | Lotha | |
| 2009/0026220 | A1* | 1/2009 | Ramnarine | F04B 13/00 222/77 |
| 2010/0224259 | A1* | 9/2010 | Aalto | E03B 7/02 137/12 |
| 2011/0114614 | A1* | 5/2011 | Flink | B23K 9/32 165/104.31 |
| 2015/0285385 | A1* | 10/2015 | Tuineag | F16K 3/32 251/304 |
| 2017/0037877 | A1* | 2/2017 | Brewer | F15B 13/0402 |
| 2017/0144245 | A1* | 5/2017 | Lotha | B23K 37/003 |
| 2018/0071857 | A1* | 3/2018 | Guenther | B23K 37/003 |
| 2021/0123362 | A1* | 4/2021 | DeGroot | B61D 7/18 |

FOREIGN PATENT DOCUMENTS

| | | |
|---|---|---|
| DE | 20 2011 052 171 U1 | 5/2012 |
| DE | 10 2018 000 762 A1 | 8/2018 |
| EP | 0 112 131 A1 | 6/1984 |
| EP | 1 688 205 A1 | 8/2006 |
| EP | 2 025 443 A1 | 2/2009 |
| KR | 2003-0044152 A | 6/2003 |
| WO | 2007/030960 A1 | 3/2007 |

OTHER PUBLICATIONS

International Preliminary Report on Patentability and Written Opinion for Application No. PCT/DE2020/200010, dated Aug. 25, 2021, 6 pgs.

* cited by examiner

APPARATUS FOR COOLING-WATER EXTRACTION FOR A ROBOT INSTALLATION PLATE, HAVING AN ADJUSTABLE EXTRACTION VOLUME

BACKGROUND

Technical Field

The disclosure relates to an apparatus for cooling-water extraction for a robot installation plate, with an adjustable extraction volume.

Description of the Related Art

In practice, it is already known to use extraction cylinders in the supply line and/or return line for cooling-water extraction within the framework of so-called robot installation plates, for example within the framework of the cooling of welding caps of a welding apparatus. Reference is made to EP 1 688 205 B1 with respect to the prior art in this respect.

For reasons of cost and also for reasons of a constantly sought reduction of installation space, such extraction cylinders are dimensioned precisely such that they are suitable for extracting a specific volume of coolant or water. If the volume is to be increased, corresponding apparatuses create problems, or the extractable volume is insufficient.

BRIEF SUMMARY

The present disclosure is therefore directed to eliminating the problems that occur in practice. This is achieved by a technical or machine-engineering measure as described herein. Accordingly, with a generic apparatus as described herein, the extraction volume is variable, i.e., adjustable. This is achieved by a sufficiently large extraction cylinder, which has a maximum extraction volume with respect to the specific application. By means of a mechanical stroke limit of the piston located in the extraction cylinder, the extraction volume can be adjusted to the precise degree necessary.

This results in various advantages, specifically a flexibility in reducing or increasing the extraction volume, without having to replace the extraction cylinder.

The volume of the cylinder can be adjusted by the stroke limit to different system requirements (for example, cooling-water pressure in the supply line and return line, hose lengths, etc.). Thus, at least one pressure equalization to 0 bar or, ideally, a restraining vacuum is generated during extraction.

The extraction volume is adjusted via the stroke limit of the cylinder by a stop. This stop can be attached both on the compressed-air side (for example, to the cylinder bottom) or on the water side of the cylinder piston arrangement. Other limits, for example a displacement of the piston bottom or limits acting from the side, are conceivable.

The stop can be formed mechanically, for example by means of an adjustment screw, or also pneumatically, fluidically or electrically, for example by means of a cylinder piston arrangement with sampling of the pressure on the supply side and automatic adjustment according to the pressure on the supply side.

Optionally, it is conceivable to adjust the volume via the cylinder stroke, wherein the cylinder generates the vacuum or the pressure equalization. A preferably mechanical vacuum manometer or a pressure switch or an electrical pressure sensor is used for monitoring and adjusting.

The extraction cylinder can be operated pneumatically by compressed air, fluidically, hydraulically or hydraulically by water, or electrically.

A further advantage is that the extraction cylinder functions even if the air pressure is lower than the water pressure in the system.

Two options to be preferred for realization exist.

On the one hand, the increase in pressure of the pneumatic "side" can be generated by a further application of pressure to the lower piston side of the water piston with compressed air, as shown in FIG. 4. This corresponds to an area enlargement.

A further option results from the increase in pressure being generated via a differential piston (area enlargement of the air piston) or via a tandem cylinder (two or more air pistons). This results in an area enlargement of the air side.

Ball valves and extraction cylinders can be actuated pneumatically in a delayed manner via a 5/2-way valve, wherein a mechanical throttle ensures that the ball valve system is first closed before the extraction cylinder is set into motion.

This time offset can also be achieved by pneumatic or electrical limit switches or time delay valves.

On the other hand, it is conceivable for two separate pneumatic valves to be controlled in a time-delayed manner via a system control.

In addition, two separate 2/2-way valves can be placed in the supply line and return line. It does not have to be a ball valve system. Such valves can be operated both electrically and pneumatically.

In addition, the directional valve in the return line can also be replaced by a non-return valve.

BRIEF DESCRIPTION OF THE SEVERAL VIEWS OF THE DRAWINGS

Various options for advantageously designing and developing the teaching of the present disclosure exist. In this respect, reference is made, on the one hand, to the claims set forth herein and, on the other hand, to the following figures and to the description contained therein. The drawings show the following:

FIGS. 1 to 8 are provided with descriptive labeling so that detailed explanations in this respect are unnecessary. In addition to the labeling, the following description is provided.

DETAILED DESCRIPTION

Figure 1:
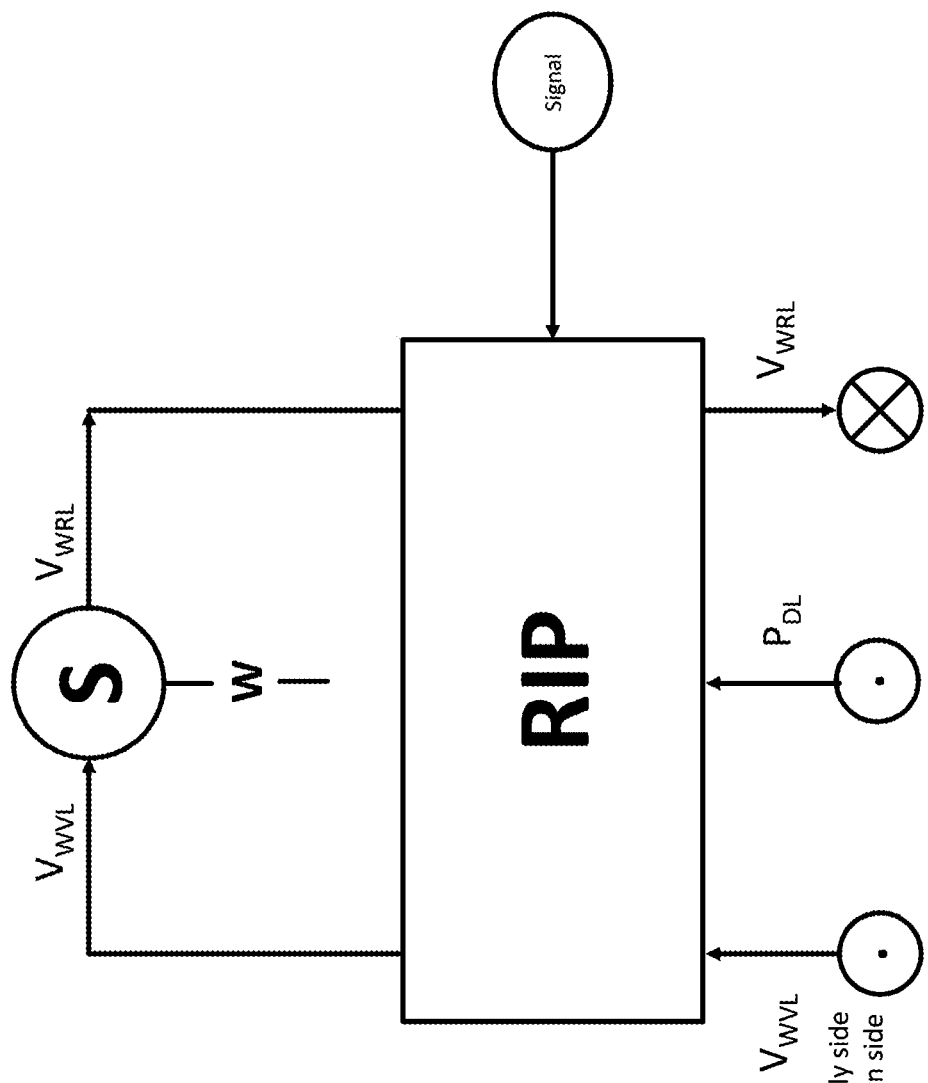
FIG. 1 shows a schematic view of a connected robot installation plate with a cooling-water supply line and a cooling-water return line according to the prior art.

FIG. 1 shows a connected robot installation plate (RIP) with a cooling-water supply line and a cooling-water return line, as sufficiently known from practice. The task of the RIP is to monitor the process, specifically to monitor the cooling water. The RIP is also used to adjust the maximum amount of water required. A hydraulic adjustment of the overall system takes place. Furthermore, the RIP serves to generate a vacuum or to equalize pressure in the case of a very special application, specifically when replacing the welding cap of a welding apparatus. As a result, the undesired discharge of cooling water should be avoided but at least reduced to a very considerable extent.

The prevention of the discharge of cooling water reduces the risk of injury due to sprayed water/puddles of water in the surrounding area; specifically, it avoids a slip hazard. Moreover, corrosion on body parts by cooling water can be effectively avoided by avoiding the discharge of cooling water. Moreover, no corrosion takes place in the region of adjacent apparatuses, for example in the production line/cell, for example in so-called "cap changers."

Finally, the RIP serves to close the supply line and return line during maintenance work, for example in the event of the loss of a welding cap due to robot movement or hose bursting. The same applies to a replacement of the welding cap, which is possible with corresponding control.

Figure 2:
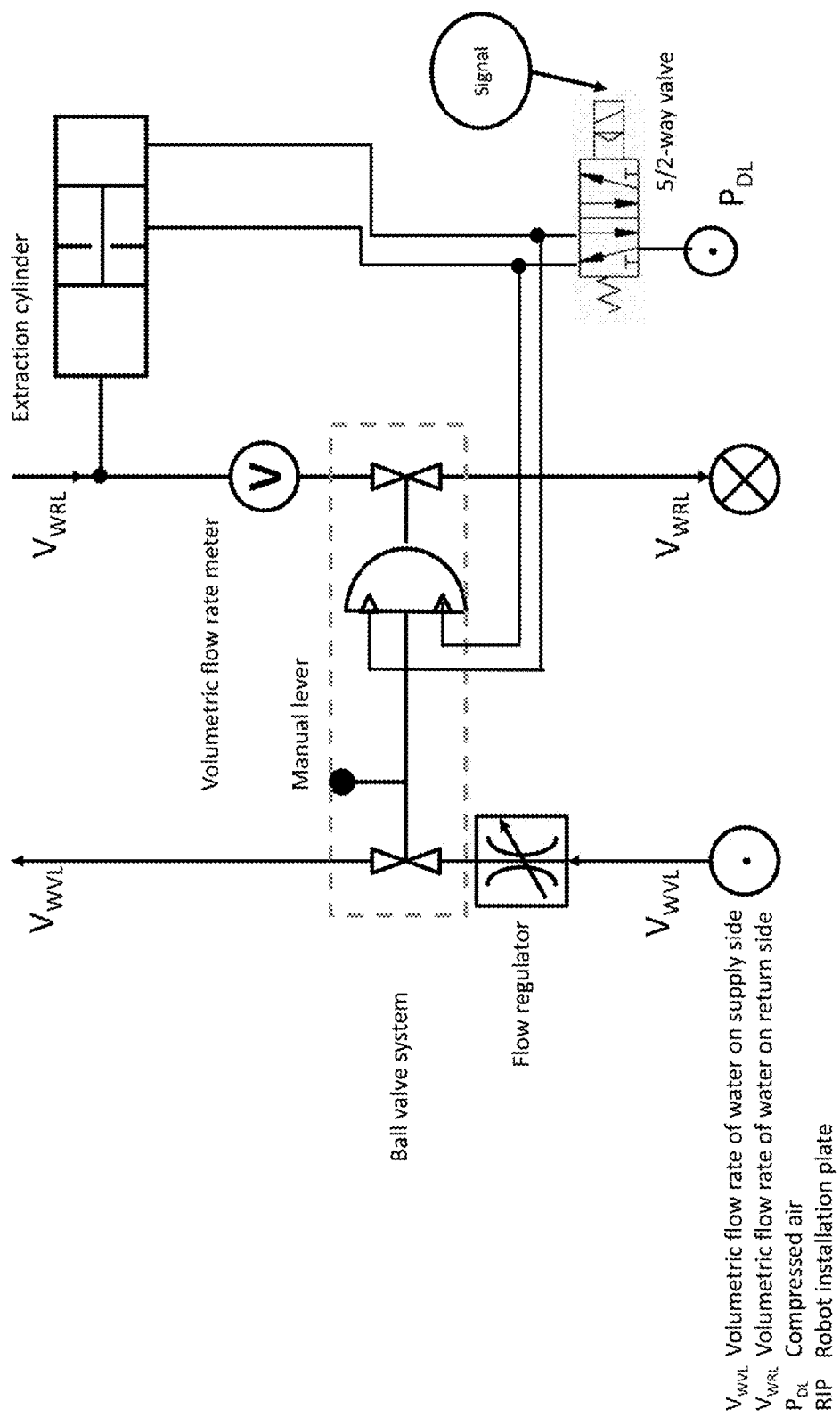
FIG. 2 shows a schematic view of a connected robot installation plate according to the prior art, wherein the water supply line and water return line and the compressed-air supply are indicated.

FIG. 2 schematically shows a connected robot installation plate, also according to the prior art, wherein the water supply line and water return line and the application of compressed air are drawn in.

A ball valve system serves to close the supply line and return line. Manual actuation is possible by means of a manual lever, for example within the scope of maintenance work.

In principle, the closing of the supply and return lines can take place automatically, specifically preferably pneumatically, for example in the event of the loss of a welding cap by robot movement or hose bursting. The closing of the supply and return lines is required for replacing welding caps and for other process problems.

A flow regulator serves to hydraulically adjust the overall system, wherein several RIPs or welding robots can be combined in a system region.

FIG. 2 also indicates a volumetric flow rate meter, which serves for monitoring the cooling water or for process monitoring.

An extraction cylinder generates a vacuum and thus ensures pressure equalization by an increase in volume due to a movement of the piston.

Figure 3:
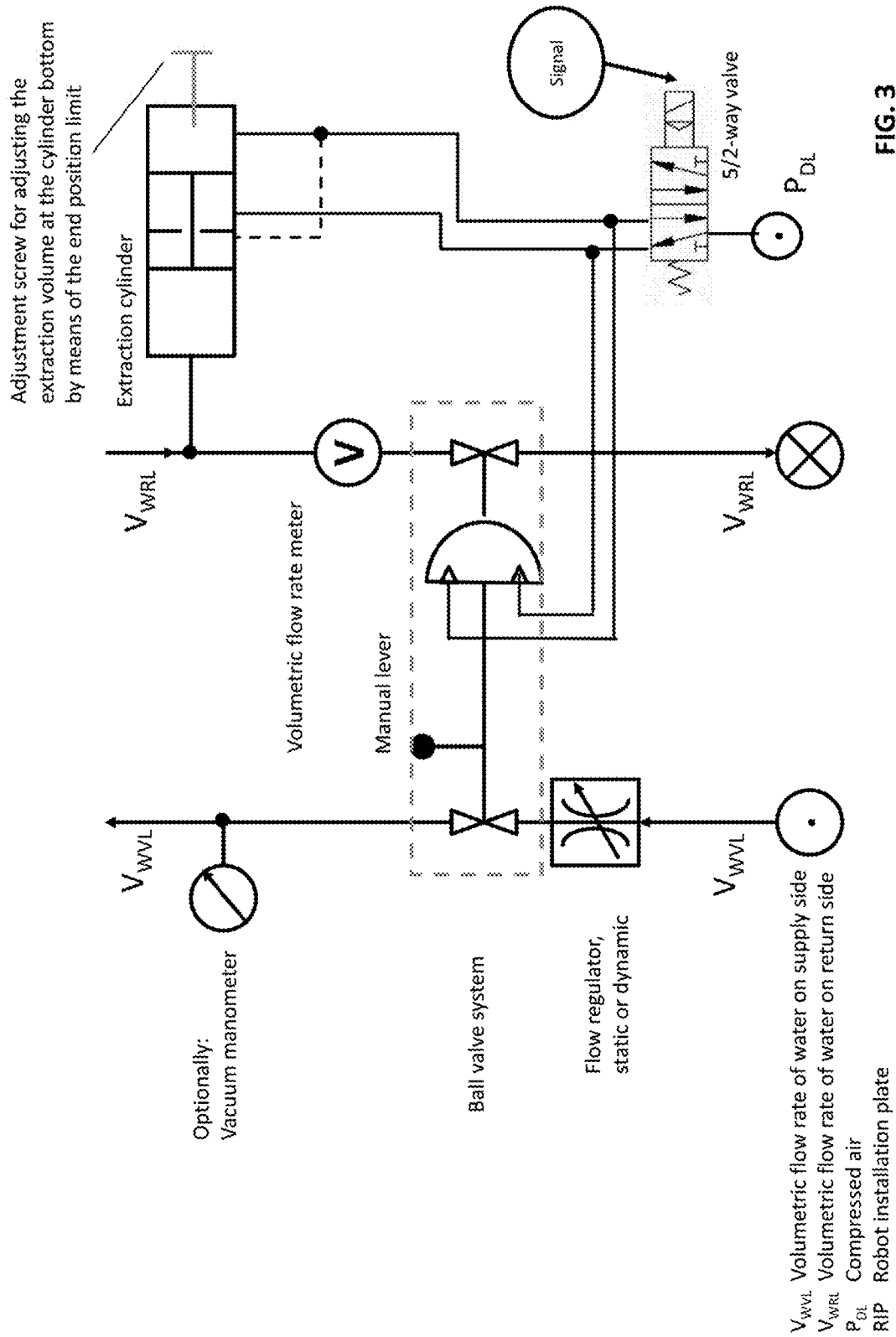
FIG. 3 shows a schematic view of a first exemplary embodiment of a robot installation plate connected according to the present disclosure with a cooling-water supply line and a cooling-water return line, together with a compressed-air supply, wherein an extraction cylinder with an end position limit is provided and a flow rate limiter arranged upstream of the ball valve system is provided.

FIG. 3 shows a first exemplary embodiment of a robot installation plate connected according to the present disclosure. In detail, the combination of a vacuum manometer and an adjustable extraction cylinder is provided there, wherein the adjustment of the extraction cylinder by means of an adjustment screw serves to adjust the extraction volume on the cylinder bottom by means of the end position limit. The specific design by means of an adjustment screw is only mentioned here by way of example.

The adjustable extraction cylinder has the advantage that the extraction volume of the cylinder can be specified exactly.

An extraction volume that is too large generates too much air in the system after the replacement of the welding cap. This in turn leads to deteriorated cooling.

An extraction volume that is too small leads to the discharge of cooling water, as a result of which a risk of injury due to puddles of water in the surrounding area and thus a slip hazard is unavoidable. Moreover, it cannot be ruled out that body parts corrode due to the cooling water.

The corrosion of other equipment in the surrounding area, specifically in the production line/cell, for example near or in the region of the cap changer, is unavoidable.

Dynamic flow regulation is possible, wherein a hydraulic adjustment of the overall system (several RIPs or welding robots in a system region) is thereby carried out independently of process changes, in particular when welding guns are switched on or off or when a change in the pump capacity of the cooling circuit takes place intentionally or unintentionally. Thus, hydraulic adjustment is independent of process changes.

Figure 4:
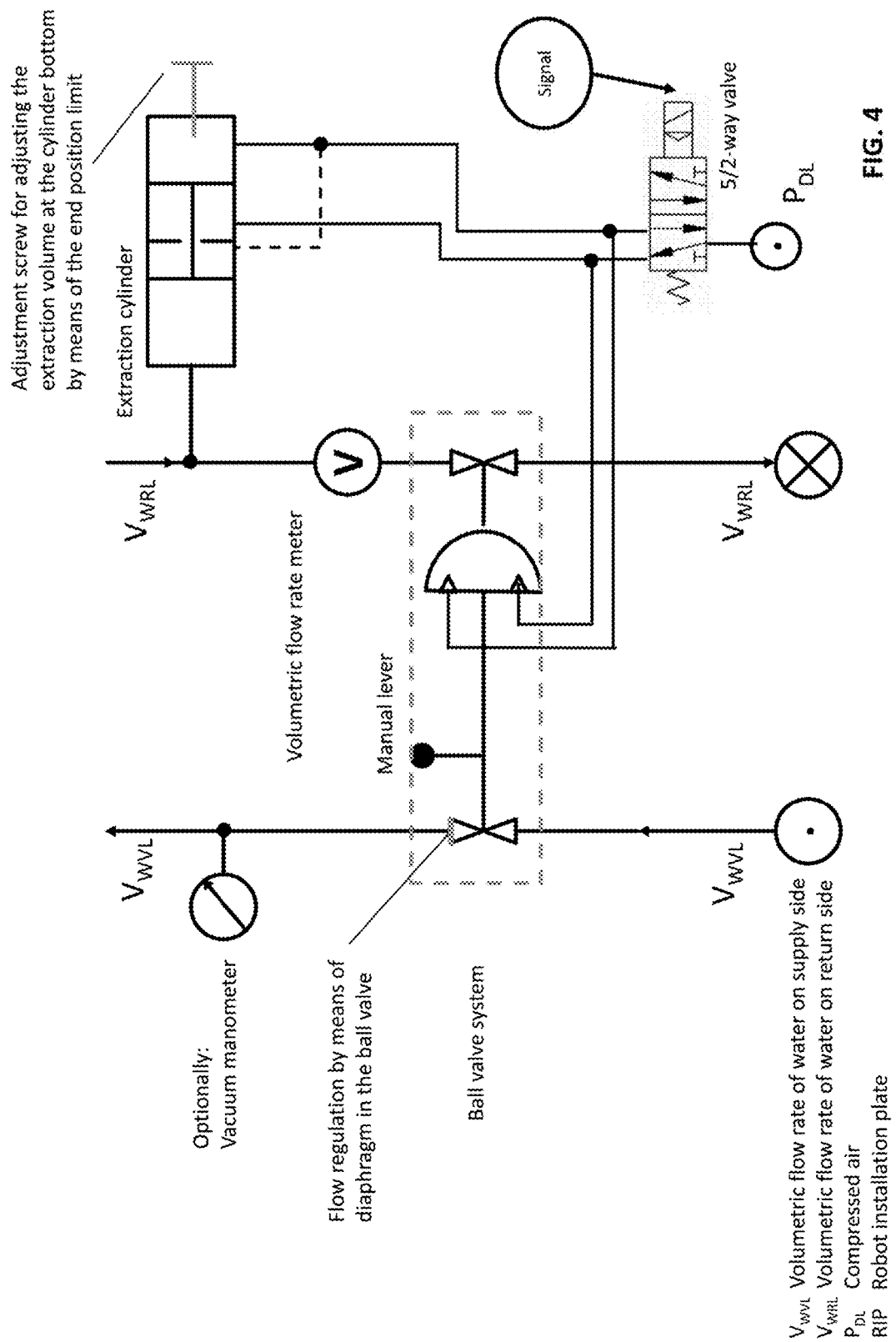
FIG. 4 shows a schematic view of a second exemplary embodiment of a robot installation plate connected according to the present disclosure with a cooling-water supply line and a cooling-water return line, together with a compressed-air supply, wherein an extraction cylinder with an end position limit is provided and a flow rate limiter arranged upstream of the ball valve system is provided, wherein the flow regulation is assigned to the ball valve system.

FIG. 4 shows a further exemplary embodiment of a robot installation plate connected according to the present disclosure, wherein flow regulation is assigned to a ball valve. In this case, a separate flow regulator is not required.

Specifically, the ball valve is assigned a characteristic control diaphragm, via which the volumetric flow rate can be regulated. Based on the functional integration implemented here, i.e., the diaphragm in the ball valve, the components and thus the installation space can be reduced.

Figure 5:
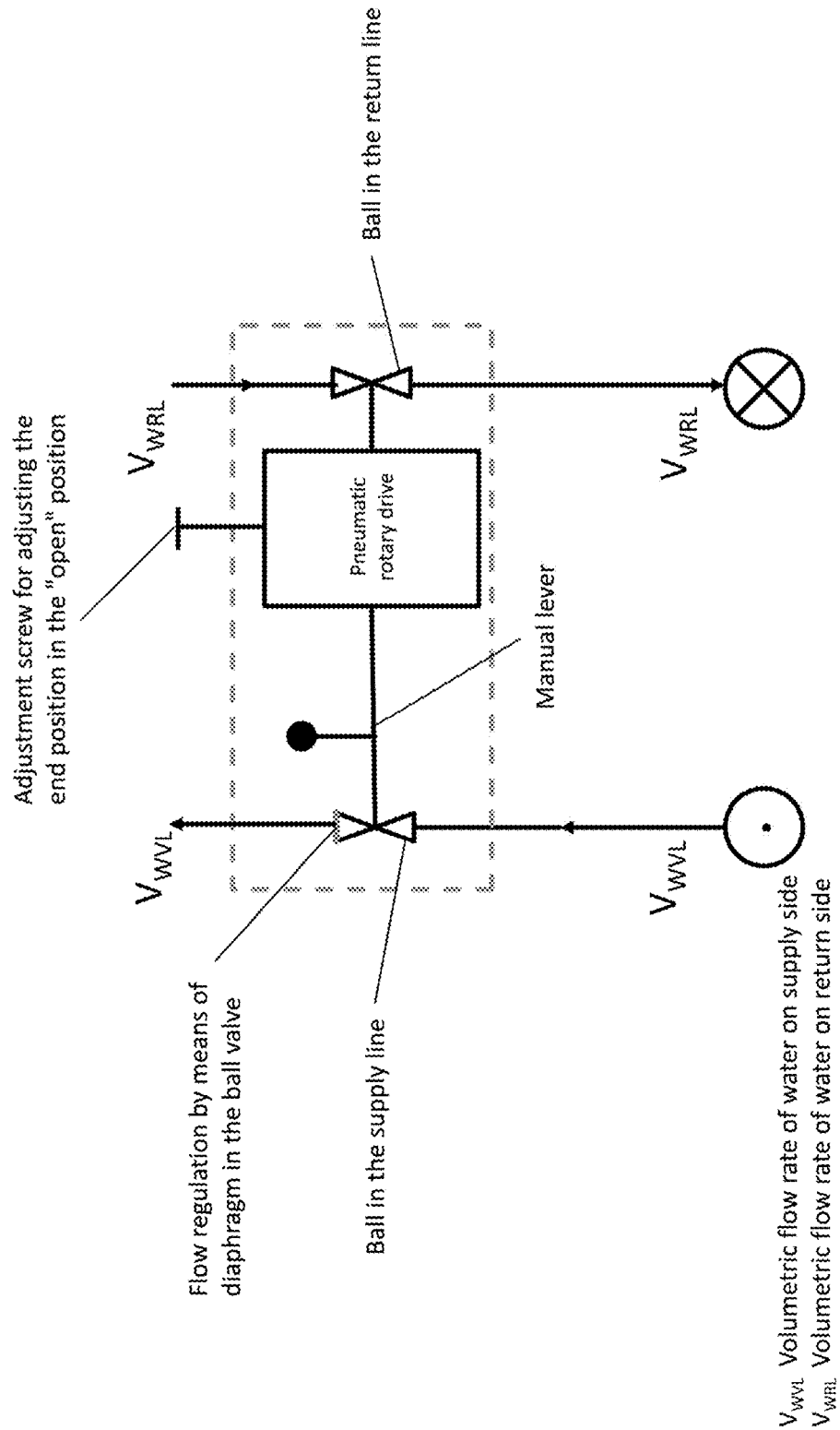
FIG. 5 shows a schematic view of, specifically, the arrangement relating to the flow regulation of FIG. 4 with the combination of pneumatic rotary drive and adjustment screw for adjusting the end position in the "open" position.

FIG. 5 shows, in a schematic view, the flow regulation in accordance with the description relating to FIG. 4.

In addition, an adjustment screw is provided in a pneumatic rotary drive, according to which precise adjustment of the volumetric flow rate is possible by the changes in the end stop of the ball valve system by the control screw. As a result of the incline of the control screw, the volumetric flow rate through the ball valve system or the control diaphragm integrated there can be adjusted with a high degree of accuracy, preferably to 0.1 l/min.

Figure 6:
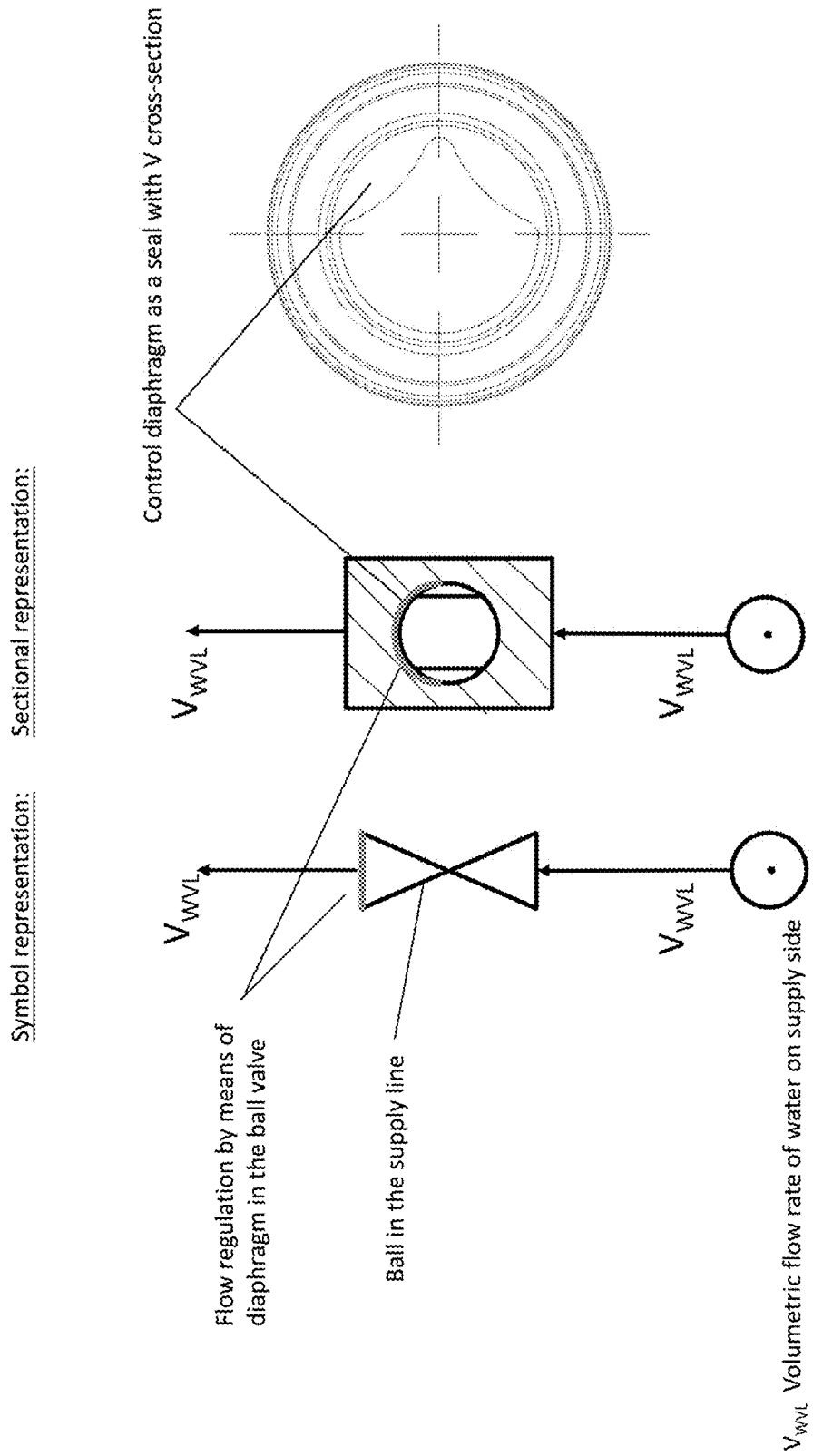
FIG. 6 shows schematic views, symbol representation on the left and section representation on the right, of the flow regulation according to FIGS. 4 and 5, wherein a control diaphragm simultaneously also serves as a seal.

FIG. 6 shows, in schematic views, the flow regulation according to FIGS. 4 and 5 in the ball valve, wherein a control diaphragm is assigned to the ball valve. The control diaphragm serves as a seal with a V-shaped cross-section.

The control diaphragm has a particular characteristic shape, as a result of which the adjustment range is greater. A more accurate and finer adjustment of the volumetric flow rate can be carried out.

Figure 7:
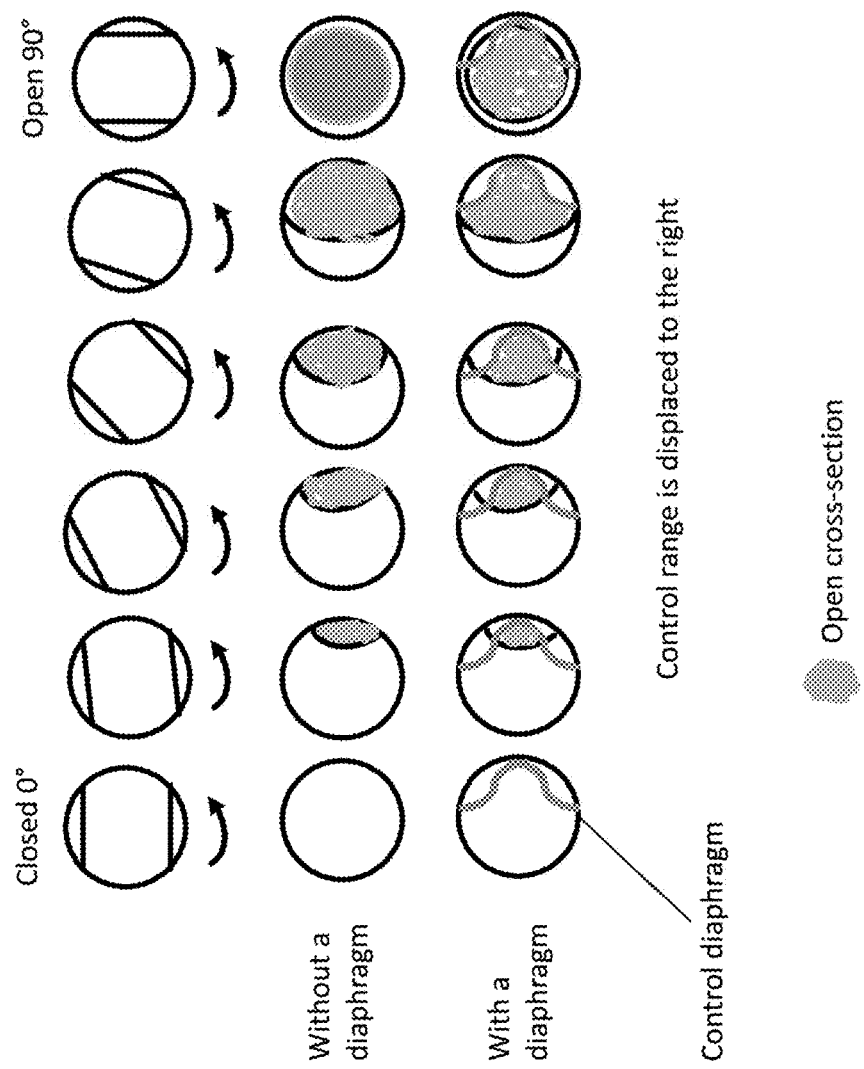
FIG. 7 shows schematic views of the control range of the ball valve of FIGS. 4 and 5, in each case without a diaphragm and with a control diaphragm, wherein the control range is displaced to the right.

FIG. 7 shows the control range of the ball valve with the control diaphragm, wherein the control range is displaced to the right.

The control range is displaced to the right by the control diaphragm, wherein the open cross-section with a diaphragm is smaller than that without a diaphragm. Thus, the volumetric flow rate can be adjusted more precisely at lower flow velocities. The control range thereby increases.

Figure 8:
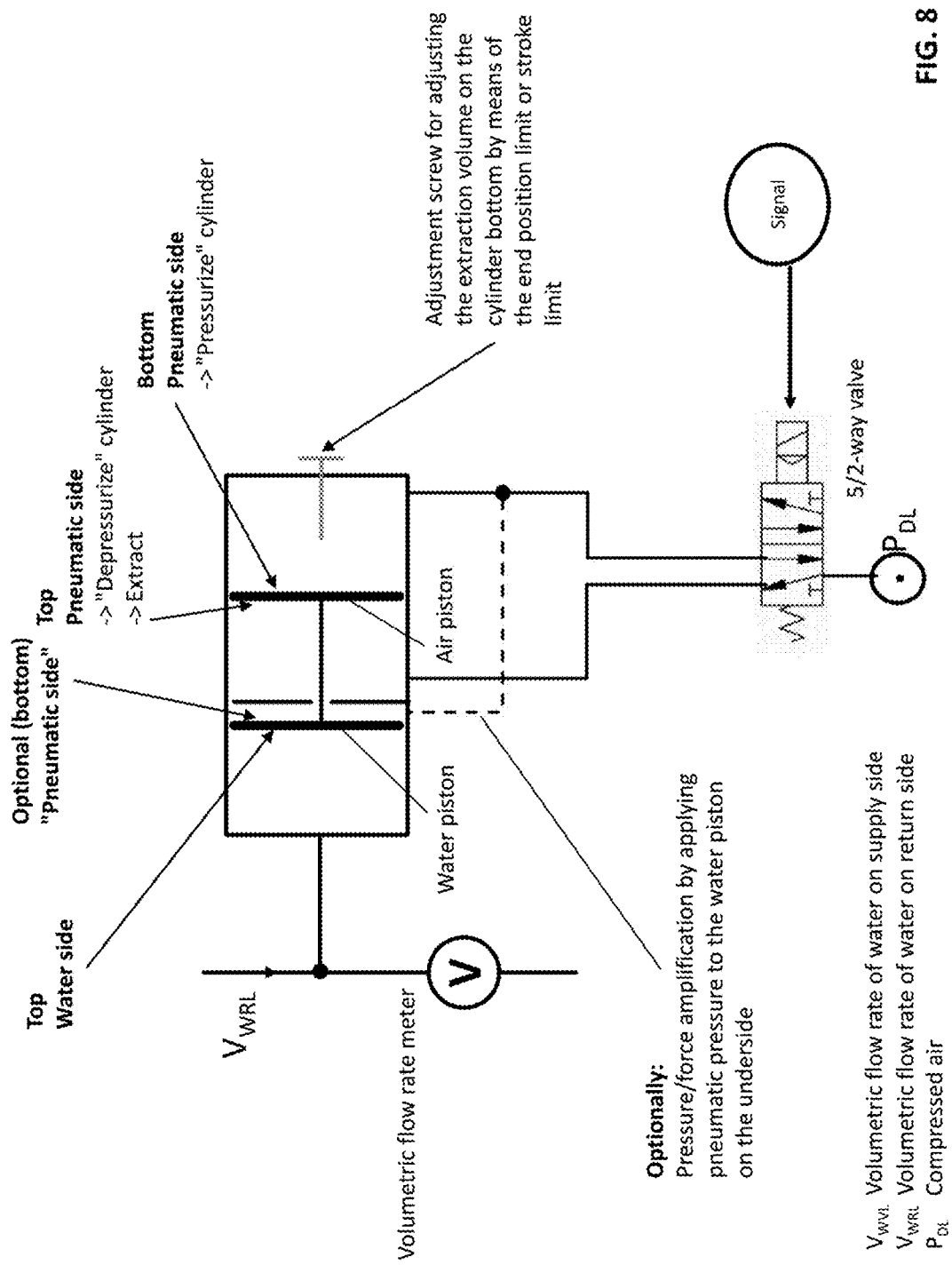
FIG. 8 shows a schematic view of the basic arrangement of an extraction cylinder with an end position limit with optional pressure/force amplification by applying pneumatic pressure to the water piston on the underside.

FIG. 8 shows a schematic view of the basic arrangement of an extraction cylinder with an end position limit, wherein a pressure/force amplification is optionally realized by applying pneumatic pressure to the water piston on the underside.

Due to an "increase" in the area of the piston, the extraction cylinder functions even if the return pressure of the cooling water rises above the system pressure of the compressed air. By providing the option of adjustment in the extraction cylinder, a variable extraction volume can be realized.

With regard to further advantageous designs of the apparatus according to the present disclosure, reference is made to the general part of the description and to the appended claims in order to avoid repetitions.

Finally, it is expressly pointed out that the exemplary embodiments described above of the apparatus according to the disclosure serve only to explain the claimed teaching but do not limit it to the exemplary embodiments.

The various embodiments described above can be combined to provide further embodiments. Aspects of the embodiments can be modified, if necessary, to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. An apparatus for cooling-water extraction for a robot installation plate, comprising:
    an extraction cylinder including a cylinder bottom and a cylinder wall, the extraction cylinder having a maximum extraction volume;
    a piston located in the extraction cylinder; and
    an adjustment screw that is on or in the extraction cylinder,
    wherein the apparatus has an adjustable extraction volume achieved by the extraction cylinder,
    wherein the extraction volume of the extraction cylinder is adjusted by a mechanical stroke limit of the piston in the extraction cylinder, the mechanical stroke limit being configured by the adjustment screw,
    wherein the adjustment screw is arrangeable in a region of the cylinder bottom or in a region of the cylinder wall, whereby an end position limit or stroke limit of the piston is achieved by a stop, and
    wherein, using the adjusting screw, the stroke limit is adjusted based on a pressure measurement from a pressure sensor.

2. The apparatus according to claim 1, wherein the mechanical stroke limit in the sense of a stroke change is realized in that the cylinder bottom is shifted or displaced in relation to the piston.

3. The apparatus according to claim 1, wherein a pressure or force amplification in the extraction cylinder takes place by a pneumatic pressure applied to an underside of the piston.

4. The apparatus according to claim 1, wherein the extraction cylinder is operable pneumatically by compressed air, fluidically, hydraulically, or electrically.

5. The apparatus according to claim 1, wherein the piston is an air piston and the apparatus further includes a differential piston, wherein a pressure increase takes place via the differential piston which provides an area enlargement of the air piston.

6. The apparatus according to claim 1, wherein the apparatus comprises a cooling-water supply line and a cooling-water return line, wherein a static flow regulator is provided in the cooling-water supply line and/or in the cooling-water return line and is arrangeable in a ball valve system.

7. The apparatus according to claim 6, wherein, for flow regulation, the ball valve system includes a control diaphragm for influencing a volumetric flow rate.

8. The apparatus according to claim 1, wherein the piston is an air piston, and wherein a pressure increase takes place via a tandem cylinder such that the apparatus includes two or more air pistons.

* * * * *